(12) United States Patent
Kurokawa et al.

(10) Patent No.: US 6,347,988 B1
(45) Date of Patent: Feb. 19, 2002

(54) SLIDE DOOR UNIT FOR USE IN AUTOMOTIVE AIR CONDITIONER

(75) Inventors: Katsuhiro Kurokawa; Akihiro Tsurushima; Yukio Tanaka, all of Tochigi (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 09/543,013

(22) Filed: Apr. 4, 2000

(30) Foreign Application Priority Data

| Oct. 14, 1999 | (JP) | 11-292850 |
|---|---|---|
| Oct. 15, 1999 | (JP) | 11-294438 |
| Dec. 28, 1999 | (JP) | 11-375836 |

(51) Int. Cl.[7] .............................. B60H 1/32
(52) U.S. Cl. ..................... 454/121; 165/42; 49/362; 454/324
(58) Field of Search ................. 49/324, 348, 349, 49/358, 360, 362; 296/221, 222, 223, 224; 454/121, 233, 284, 322, 324, 161; 165/41, 42, 43, 202, 203, 204

(56) References Cited

U.S. PATENT DOCUMENTS

| 3,774,863 A | * 11/1973 | Ekama |  |
| 3,802,125 A | * 4/1974 | Baker |  |
| 4,852,638 A | 8/1989 | Hildebrand et al. | 165/42 |
| 5,524,960 A | * 6/1996 | Townsend |  |
| 5,537,782 A | * 7/1996 | Klippert et al. | 49/358 |
| 5,701,949 A | 12/1997 | Yamaguchi et al. | 165/42 |
| 5,899,806 A | * 5/1999 | Hase et al. | 454/161 X |
| 5,946,857 A | * 9/1999 | Davies et al. | 49/349 X |
| 6,032,723 A | * 3/2000 | Tsuhiji et al. | 165/42 |
| 6,048,263 A | * 4/2000 | Uchida et al. | 454/121 |
| 6,250,013 B1 | * 6/2001 | Apprich | 49/362 X |
| 6,270,400 B1 | * 8/2001 | Tsurushima et al. | 454/121 |

FOREIGN PATENT DOCUMENTS

| JP | 6-018018 | 8/1994 |
| JP | 6-018021 | 8/1994 |
| JP | 8-132852 | 5/1996 |
| JP | 8-282248 | 10/1996 |
| JP | 9-099725 | 4/1997 |
| JP | 9-123748 | 5/1997 |
| JP | 9-267620 | 10/1997 |
| JP | 10-297249 | 11/1998 |
| JP | 11-78482 | 3/1999 |
| JP | 11-099820 | 4/1999 |
| JP | 11-235921 | 8/1999 |
| JP | 11-254942 | 9/1999 |

* cited by examiner

*Primary Examiner*—Ljiljana V. Ciric
(74) *Attorney, Agent, or Firm*—Foley & Lardner

(57) ABSTRACT

A slide door unit for an automotive air conditioner, has a door housing which has a concave inner surface and laterally opposed side walls. The side walls have arcuate guide grooves respectively. A slide door member has a convex outer surface slidable on and along the concave inner surface of the door housing. The slide door member has a concave inner surface. Racks are provided on laterally opposed sides of the concave inner surface of the slide door member. Guide pins are secured to laterally opposed ends of the slide door member. The guide pins are slidably engaged with the arcuate guide grooves of the door housing. A pinion gear unit includes two pinion gears and a shaft by which the pinion gears are connected. The pinion gear unit is rotatably held by the laterally opposed side walls of the door housing having the two pinion gears meshed with the racks respectively. A resilient structure is further provided, which is defined by each of the pinion gears of the pinion gear unit. The resilient structure biases the pinion gears against the racks thereby pressing the guide pins against bottom walls of the corresponding arcuate guide grooves when the pinion gear unit is properly held by the door housing.

16 Claims, 16 Drawing Sheets

SLIDE DOOR UNIT FOR USE IN AUTOMOTIVE AIR CONDITIONER

BACKGROUND OF THE INVENTION

1. Field of the Invention

The present invention relates in general to automotive air conditioners, and more particularly to automotive air conditioners of a type employing a slide type air mixing door which, when sliding, varies a flow rate between heated air and cooled air which are mixed in an air mixing chamber before being led into a passenger compartment of the vehicle. More specifically, the present invention is concerned with a slide door unit or cassette detachably installed in the automotive air conditioner, which generally comprises a door housing, a slide door proper slidably held by the door housing and a driving mechanism for driving the slide door proper relative to the door housing.

2. Description of the Prior Art

In order to clarify the task of the present invention, an automotive air conditioner 100 using a known slide door arrangement will be briefly described with reference to FIG. 16, which is shown in Japanese Patent First Provisional Publication 11-254942.

The air conditioner 100 comprises a case 102 which defines therein an upstream air passage 104, a first downstream air passage 106, a second downstream air passage 108 and an air mix chamber 110. The first and second downstream air passages 106 and 108 have respective upstream mouth portions exposed to a downstream end of the upstream air passage 104 and have respective downstream portions merged with the air mix chamber 110. Air outlet openings 112 and 114 are formed at a downstream end of the air mix chamber, whose opening degrees are controlled by pivotal mode doors 116 and 118. An evaporator 120 is installed in the upstream air passage 104 and a heater unit 122 is in the first downstream air passage 106, as shown. Although now shown in the drawing, an air intake unit is arranged beside the case 102, by which outside/inside air is led into the upstream air passage 104, which then flows downward in such a manner as is indicated by thicker arrows.

A slide door mechanism SDM is provided in front of the mouth portions of the first and second downstream air passages 106 and 108 for varying the opening degree of the mouth portions of the passages 106 and 108.

The slide door mechanism SDM comprises generally a slide door proper 124, two pairs of guide pins 126a and 126b fixed to front and rear side ends of the slide door proper 124, and two pairs of arcuate guide grooves 128a and 128b formed in opposed side walls of the case 102 to slidably receive therein the guide pins 126a and 126b. The slide door proper 124 has at lateral lower sides respective racks (no numeral) which are meshed with respective pinion gears 130 which are coaxially connected through a shaft 132 whose both ends are rotatably held by the opposed side walls of the case 102. Although not shown, an electric actuator is arranged near the pinion gears 130 to drive the same. Thus, when the electric actuator is energized for a given time, the pinion gears 130 are rotated in one or other direction moving the slide door proper 124 to a desired position along a given way defined by the two pairs of guide grooves 128a and 128b.

However, due to inherent construction, the above-mentioned conventional air conditioner 100 has several drawbacks which are as follows. First, movement of the slide door proper 124 along the given way tends to produce a rattling noise due to a rough sliding mating of the guide pins 126a and 126b with the guide grooves 128a and 128b. In fact, a certain clearance needed between each guide pin 126a or 126b and walls of the corresponding guide groove 128a or 128b for the movement of the guide pin relative to the groove causes a play of the slide door proper 124 during its movement, which induces the production of rattling noise. This undesired phenomenon become much severe when the guide pins 126a and 126b and the case 102 by which the guide grooves 128a and 128b are defined are constructed of same plastic materials. In this case, smoothed movement of the slide door proper 124 is not expected. Second, it needs a skilled and time-consuming assembling work for assembling the slide door proper 124 in a proper position of the case 102. That is, since the guide grooves 128a and 128b to which the guide pins 126a and 126b of the slide door proper 124 are to be engaged are formed in the inner walls of the case 102, the assembling work should be made awkwardly in such a limited space in the case 102.

SUMMARY OF THE INVENTION

It is therefore an object of the present invention to provide an automotive air conditioner which is free of the above-mentioned drawbacks.

It is another object of the present invention to provide a slide door unit which is suitable for the automotive air conditioner.

It is still another object of the present invention to provide a slide door unit which is characterized by smoothed movement of a slide door member relative to a door housing.

It is a further object of the present invention to provide a slide door unit in which, due to usage of a resilient structure defined by a pinion gear unit, a slide door member is constantly biased toward the door housing thereby to suppress undesired play of the slide door member.

It is a still further object of the present invention to provide a slide door unit which can be assembled with ease.

According to a first aspect of the present invention, there is provided a slide door unit for use in an automotive air conditioner, which comprises a door housing having a concave inner surface and laterally opposed side walls, the side walls having arcuate guide grooves respectively; a slide door member having a convex outer surface slidable on and along the concave inner surface of the door housing, the slide door member having a concave inner surface; racks provided on laterally opposed sides of the concave inner surface of the slide door member; guide pins secured to laterally opposed ends of the slide door member, the guide pins being slidably engaged with the arcuate guide grooves of the door housing; a pinion gear unit including two pinion gears and a shaft by which the pinion gears are connected, the pinion gear unit is rotatably held by the laterally opposed side walls of the door housing having the two pinion gears meshed with the racks respectively; and a resilient structure defined by each of the pinion gears of the pinion gear unit, the resilient structure biasing the pinion gears against the racks thereby pressing the guide pins against bottom walls of the corresponding arcuate guide grooves when the pinion gear unit is properly held by the door housing.

According to a second aspect of the present invention, there is provided a slide door unit for use in an automotive air conditioner, which comprises a barrel door housing having a concave inner surface and laterally opposed side walls each having a crescent shape; an arcuate guide groove formed at an inner surface of each side wall of the door housing; a guide pin entrance groove formed at the inner surface of each side wall of the door housing, the entrance groove extending from the arcuate guide groove to the outside of the side wall; a barrel slide door member having a convex outer surface slidable on and along the concave inner surface of the door housing, the slide door member having a concave inner surface; racks integrally formed on laterally opposed sides of the concave inner surface of the slide door member; two upper guide pins secured to upper portions of laterally opposed ends of the slide door member respectively, the two upper guide pins being slidably engaged with one zones of the arcuate guide grooves of the opposed side walls respectively; two lower guide pins secured to lower portions of the laterally opposed ends of the slide door member respectively, the two lower guide pins being slidably engaged with the other zones of the arcuate guide grooves of the opposed side walls respectively; a pinion gear unit including two pinion gears and a shaft by which the pinion gears are coaxially connected, the pinion gear unit being rotatably held by the side walls of the door housing having the two pinion gears meshed with the racks respectively; and a plurality of arcuate grooves concentrically formed in each of the pinion gears of the pinion gear unit to provide the pinion gear with a resiliency by which the pinion gears are biased against the racks thereby to press the guide pins against bottom walls of the corresponding arcuate guide grooves.

According to a third aspect of the present invention, there is provided a slide door unit for use in an automotive air conditioner, which comprises a barrel door housing having a concave inner surface and laterally opposed side walls each having a crescent shape; upper and lower arcuate guide grooves formed at an inner surface of each side wall of the door housing, the upper and lower arcuate guide grooves being arranged lengthwise; upper and lower guide pin entrance grooves formed at the inner surface of each side wall of the door housing, the entrance grooves extending from the respective upper and lower arcuate guide grooves to the outside of the side walls; a barrel slide door member having a convex outer surface slidable on and along the concave inner surface of the door housing, the slide door member having a concave inner surface; racks integrally formed on laterally opposed sides of the concave inner surface of the slide door member; two upper guide pins secured to upper portions of laterally opposed ends of the slide door member respectively, the two upper guide pins being slidably engaged with the upper guide grooves of the opposed side walls respectively; two lower guide pins secured to lower portions of the laterally opposed ends of the slide door member respectively, the two lower guide pins being slidably engaged with the lower guide grooves of the opposed side walls respectively; a pinion gear unit including two pinion gears and a shaft by which the pinion gears are coaxially connected, the pinion gear unit being rotatably held by the side walls of the door housing having the two pinion gears meshed with the racks respectively; and a plurality of arcuate grooves concentrically formed in each of the pinion gears of the pinion gear unit to provide the pinion gear with a resiliency by which the pinion gears are biased against the racks thereby to press the guide pins against bottom walls of the corresponding arcuate guide grooves.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
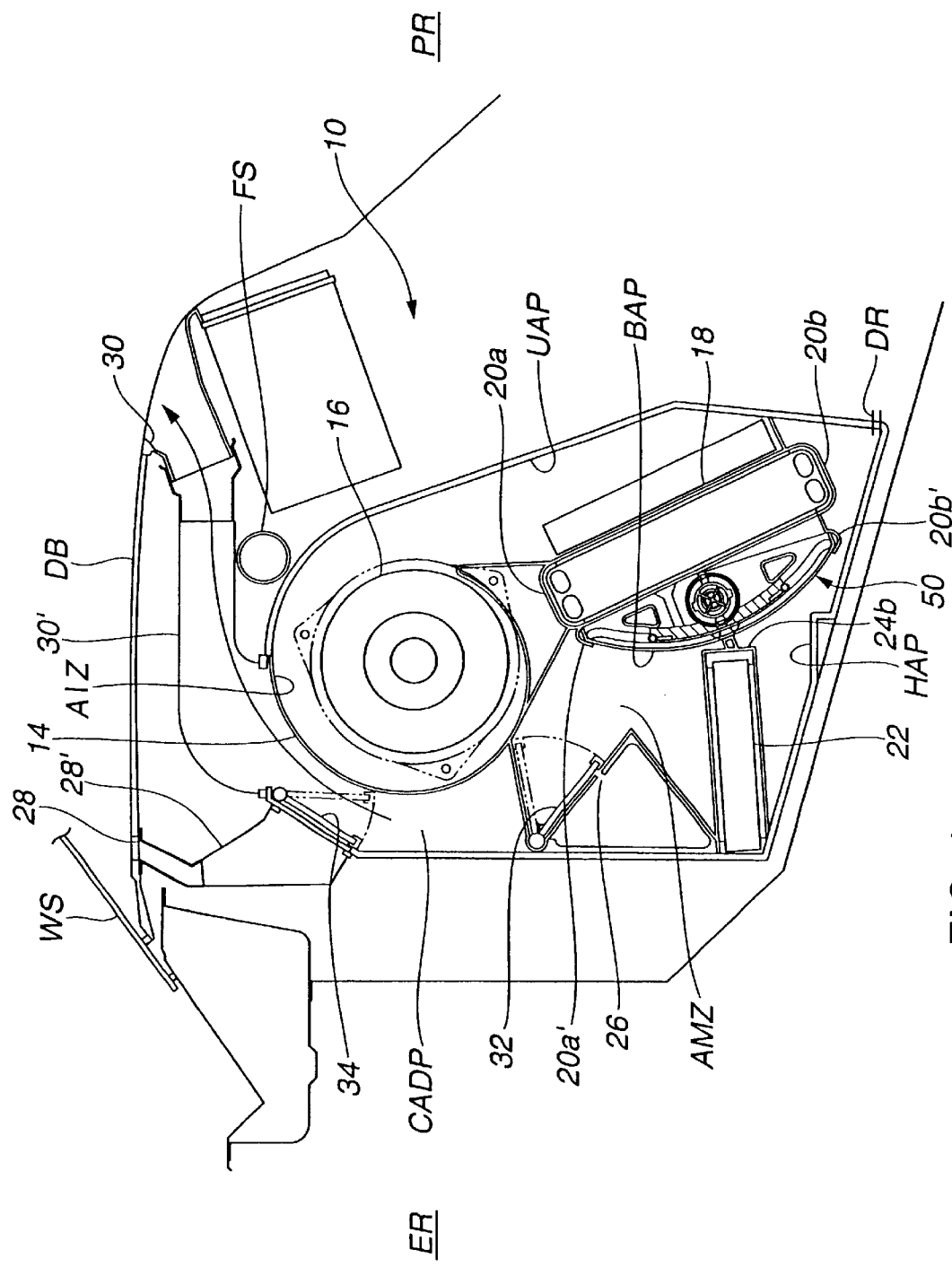
FIG. 1 is a partial and sectional view of a motor vehicle at a dash board area where an automotive air conditioner employing a slide door unit of the present invention is installed.

In the following, embodiments of the present invention will be described with reference to the accompanying drawings.

For ease of understanding, the description will be made with the aid of directional terms, such as, upper, lower, right, left, upward, downward and the like. However, it is to be noted that such terms are to be understood with respect to only the drawing or drawings on which the corresponding parts or construction is shown.

Referring to FIG. 1, there is shown an automotive air conditioner 10 to which a slide door unit or cassette of the present invention is practically applied. Denoted by EP and PR in this drawing are an engine room and passenger room defined in an associated motor vehicle. A dash board is denoted by DB. Within the dash board DB, there is provided a fixed structure FS by which a steering column (not shown) is tightly held. The automotive air condition is installed in or below the dash board DB and held by the fixed structure FS.

Figure 2:
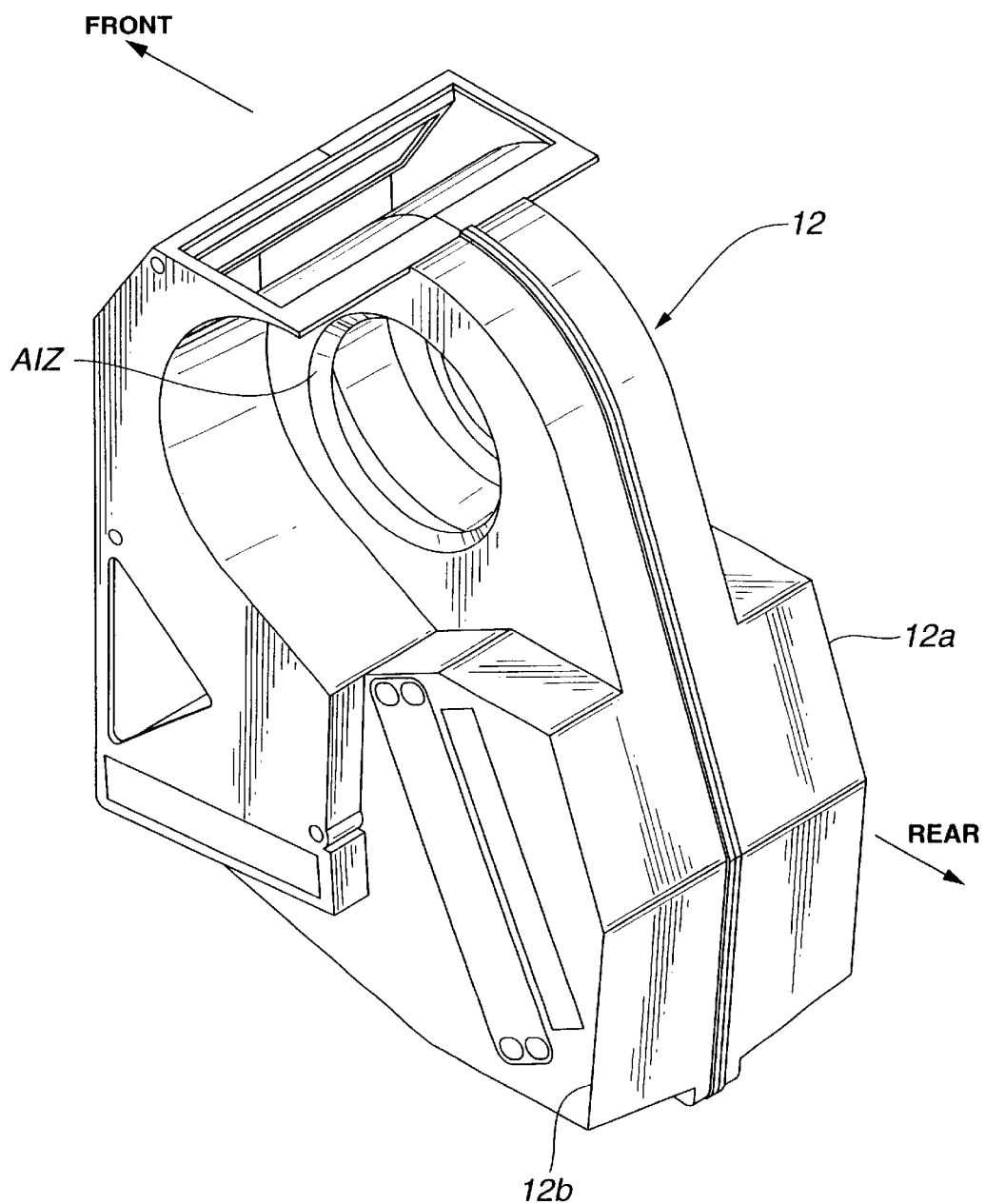
FIG. 2 is a perspective view of a split type case of the automotive air conditioner, which installs therein the slide door unit of the invention.
Figure 3:
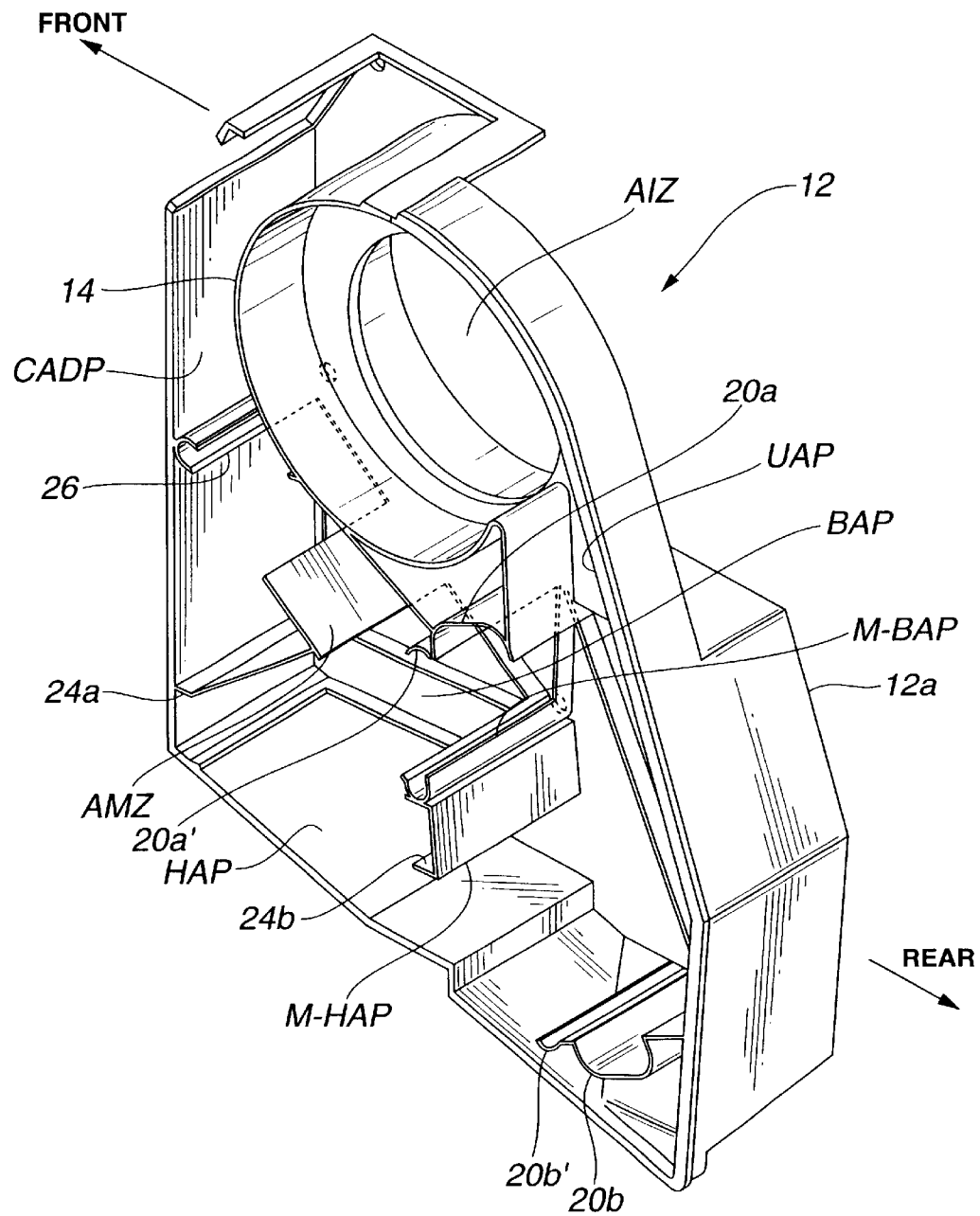
FIG. 3 is a perspective view of a right-side half part of the split type case.

As is seen from FIGS. 2 and 3, a case 12 of the automotive air conditioner is of a split type including right and left half parts 12a and 12b which are detachably coupled by means of bolts or the like to form a hollow construction.

As is seen from FIGS. 1 and 3, within the case 12, there are generally defined an air intake zone AIZ, an upstream air passage UAP, first and second downstream air passages HAP and BAP, an air mix zone AMZ and a conditioned air distribution passage CADP. For ease of description, in the following, the first and second downstream air passages HAP and BAP will be referred to heated air passage and bypass air passage respectively.

The air intake zone AIZ is defined by a cylindrical wall 14 provided by the case 12, and the air intake zone AIZ has an air blower 16 installed therein for taking in outside air and/or inside air.

The upstream air passage UAP extends from the air intake zone AIZ to respective mouth portions of the heated air and bypass air passages HAP and BAP. As is seen from FIG. 3, the mouth portions of the heated air and bypass air passages HAP and BAP are respectively denoted by M-HAP and M-BAP, which are defined by partition walls provided by the case 12.

Within the upstream air passage UAP, there is arranged an evaporator 18. In the illustrated arrangement, the evaporator 18 is inclined by about 20 degrees relative to an imaginary vertical plane defined in the case 12. The evaporator 18 may be inclined by an angle ranging from 0 to 30 degrees. For holding the evaporator 18, upper and lower brackets 20a and 20b are provided by the case 12. Denoted by reference "DR" at a position below the lower bracket 20b is a drain pipe through which liquid water condensed by the evaporator 18 is discharged to the outside.

Within the heated air passage HAP, there is installed a heater unit 22 which is arranged generally horizontally. If desired, the heater unit 22 may be slightly raised by about 10 degrees relative to an imaginary horizontal plane defined in the case 12. For holding the heater unit 22, front and rear brackets 24a and 24b are provided by the case 12.

The heated air and bypass air passages HAP and BAP have downstream ends which are merged to form the air mix zone AMZ from which the conditioned air distribution passage CADP extends to a foot duct opening 26 provided by the case 12, and to a defroster opening 28 and a ventilation opening 30 which are provided by the dash board DB of the vehicle. As shown, the foot duct opening 26 is positioned near the air mix zone AMZ, while the defroster opening 28 and the ventilation opening 30 are positioned remote from the air mix zone AMZ. That is, ducts 28' and 30' are used for connecting the conditioned air distribution passage CADP with the openings 28 and 30, as shown. A first pivot door 32 is arranged to control both the open degree of the foot duct opening 26 and the open degree of the passage led to the defroster opening 28 and the ventilation opening 30, and a second pivot door 34 is arranged to control the open degree of the defroster opening 28 and that of the passage led to the ventilation opening 30. The foot duct opening 26 is used for conveying hot air to a lower space of the passenger room PR of the vehicle, the defroster opening 28 is used for blowing conditioned air to a windshield WS for defrosting the same, and the ventilation opening 30 is used for blowing conditioned air to a center area of the passenger room PR.

Under operation, the evaporator 18 cools air flowing in the upstream air passage UAP, and the heater unit 22 heats air flowing in the heated air passage HAP.

As is seen from FIGS. 1 and 3, at the mouth portions M-HAP and M-BAP of the heated air and bypass air passages HAP and BAP, there is installed a slide door unit 50 for controlling the opening degree of the mouth portions M-HAP and M-BAP. The slide door unit 50 is detachably connected to a right position by means of bolts or the like.

Figure 4:
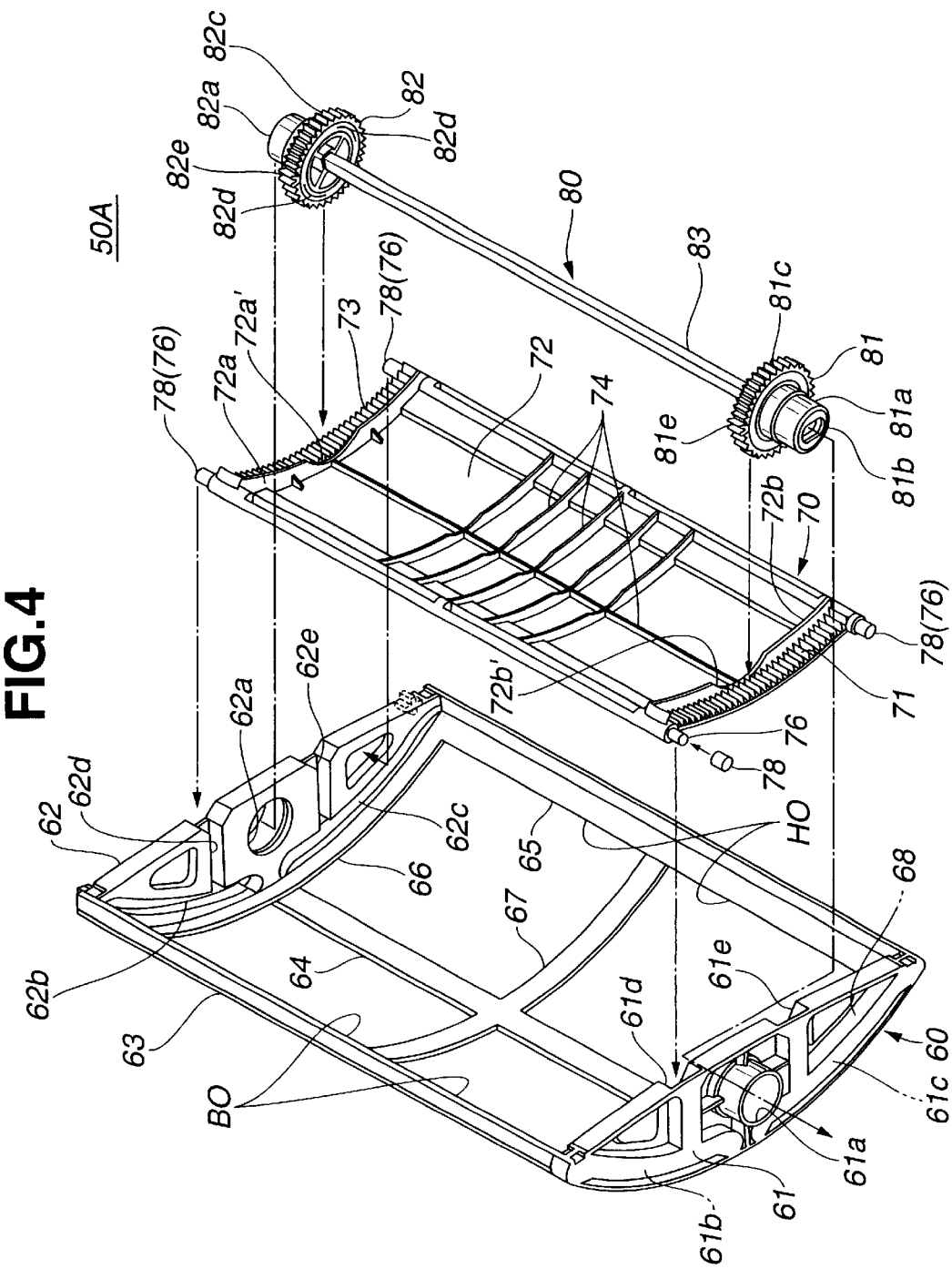
FIG. 4 is an exploded view of a slide door unit which is a first embodiment of the present invention.
Figure 5:
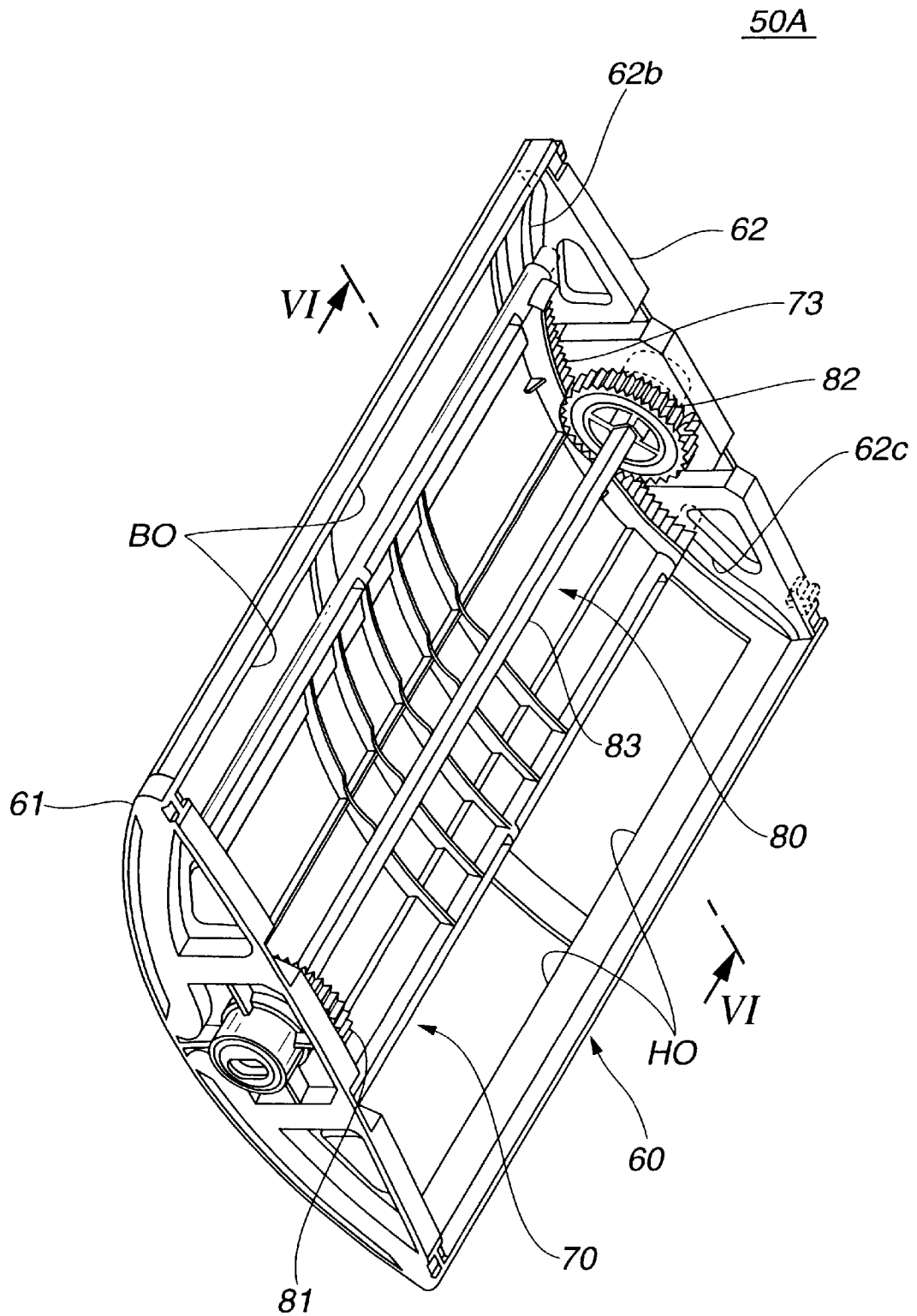
FIG. 5 is a perspective view of the slide door unit of the first embodiment in an assembled condition.

Referring to FIGS. 4 to 8, particularly FIGS. 4 and 5, there is shown a slide door unit 50A which is a first embodiment of the present invention.

As is seen from FIG. 4, the slide door unit 50A comprises generally three units, which are a barrel (or arch-shaped) door housing 60, a barrel slide door member 70 and a pinion gear unit 80 which are assembled together. As will be described in detail in the following, the slide door member 70 is arranged to slide on a concave inner surface of the door housing 60, and the pinion gear unit 80 is arranged to drive the slide door member 70 on and along the concave inner surface of the door housing 60.

The barrel door housing 60 is constructed of a plastic, such as polypropylene (PP) or the like and comprises two crescentshaped side walls 61 and 62 which are opposed in a lateral direction, three straight beam members 63, 64 and 65 which laterally extend between the two side walls 61 and 62, and three arcuate bar members 66, 67 and 68 which longitudinally extend to connect the three straight beam members 63, 64 and 65. Thus, these beam and bar members 63, 64, 65, 66, 67 and 68 constitute a rectangular barrel frame, as shown.

As will be described in detail hereinafter, when the slide door unit 50A is properly installed in the right position in the air conditioner 10, two rectangular openings "BO" defined between the two straight bar members 63 and 64 face the mouth portion M-BAP of the bypass air passage BAP, while and the other two rectangular openings "HO" defined between the two straight bar members 64 and 65 face the mouth portion M-HAP of the heated air passage HAP.

The two crescent-shaped side walls 61 and 62 are spaced by a distance that corresponds to the effective length of the evaporator 18.

Each side wall 62 or 61 is formed at a middle portion thereof with a bearing bore 62a or 61a and at an inside surface thereof a pair of arcuate guide grooves 62b and 62c (or, 61b and 61c). As shown, the paired arcuate guide grooves 62b and 62c (or, 61b and 61c) are arranged lengthways and positioned at the innermost area of the door housing 60. The paired arcuate guide grooves 62b and 62c (or, 61b and 61c) have mutually facing ends which are separated by a solid part of the side wall 62 or 61.

Figure 7:
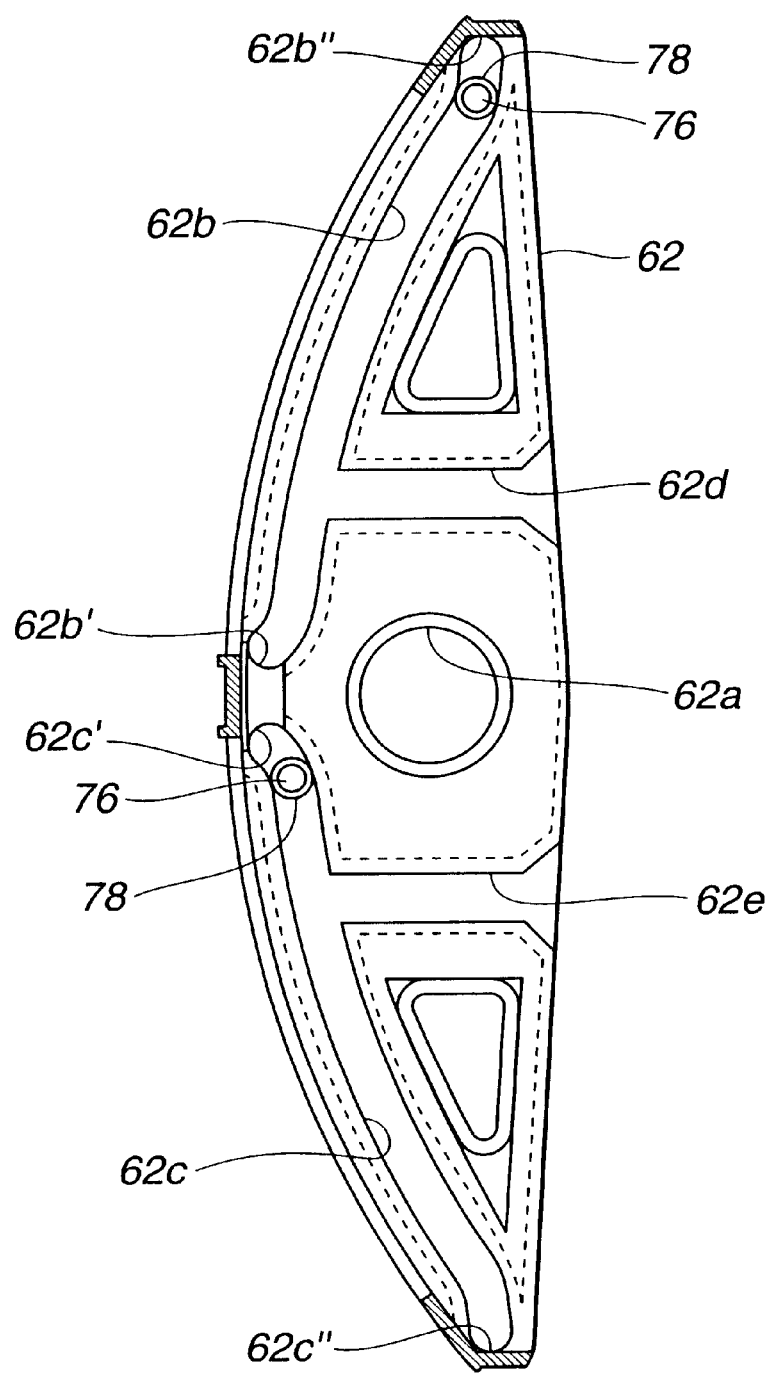
FIG. 7 is a view similar to FIG. 6, but showing only a side wall of a door housing employed as a part of the slide door unit of the first embodiment.

As is best seen from FIG. 7, each of the arcuate guide grooves 62b and 62c has inner and outer ends 62b' and 62b" (or, 62c' and 62c") which are bent outward, that is, toward the outside of the door housing 60.

Referring back to FIG. 4, each side wall 62 or 61 is formed at the inside surface thereof with two pin entrance grooves 62d and 62e (or, 61d and 61e) which are merged at their leading ends with the arcuate guide grooves 62b and 62c (or, 61b and 61c), respectively.

The slide door member 70 is constructed of a plastic, such as polypropylene or the like. As shown, the slide door member 70 is shaped convex so that it is neatly and slidably received in the barrel door housing 60. That is, the lateral length of the slide door member 70 is substantially the same as the length between the opposed side walls 61 and 62 of the door housing 60. The slide door member 70 has a size to sufficiently cover each of the above-mentioned rectangular openings "BO" and "HO" provided by the door housing 60.

The slide door member 70 generally comprises a convex rectangular major portion 72 and a reinforcing rib structure 74 integrally formed on the major portion 72 to reinforce the same. The slide door member 70 has at its four corners respective guide pins 76 each having a collar 78 rotatably disposed thereabout. That is, each side of the slide door member 70 has a pair of guide pins 76 which have the collars 78.

Figure 6:
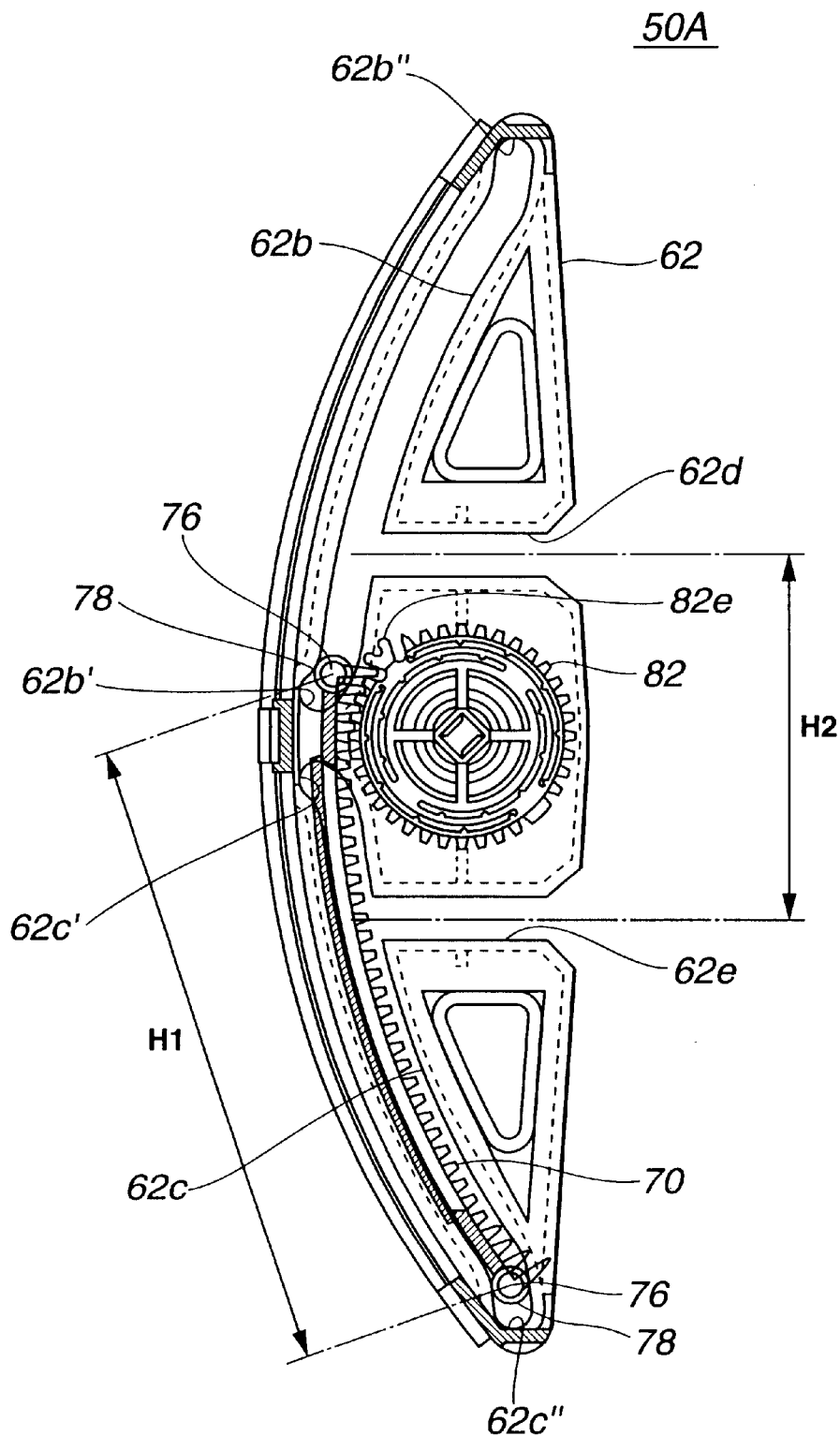
FIG. 6 is an enlarged sectional view taken along the line VI—VI of FIG. 5.

As is seen from FIGS. 5 and 6, upon assembly, each pair of the guide pins 76 with the collars 78 are respectively received in each pair of the guide grooves 62b, 62c, 61b and 61c of the side walls 62 and 61 of the door housing 60. With this, the slide door member 70 can slidably and swingably move in the door housing 60 along a given way determined by the guide grooves 62b, 62c, 61b and 61c.

As is seen from FIG. 6, the distance "H1" between the two guide pins 76 provided on each side of the slide door member 70 is greater than the distance "H2" between the pin entrance grooves 62d and 62e (or, 61d and 61e) formed in each side wall 62 or 61 of the door housing 60. With this, once the four guide pins 76 are all set in the respective guide groove 62b, 62c, 61band 61c, they can not easily come out from the grooves. It is to be noted that due to usage of the collars 78, movement of the guide pins 76 in and along the guide grooves 62b, 62c, 61b and 61c is smoothly carried out.

The collars 78 are constructed of a plastic, such as polyacetal resin or the like. If desired, in place of the collars 78, plastic caps may be used each covering end of the guide pin 76. Furthermore, if desired, a metal roller may be used in place of the collar 78 for much smoothing the movement of the slide door member 70. Furthermore, if desired, in place of the collar 78, a sliding tape may be used, which is put around the guide pin 76.

As is understood from FIG. 7, the outwardly bent ends 62b' and 62b" (or, 62c' and 62c") of each guide groove 62b or 62c constitute pin holding zones into which the pins 76 of each side of the slide door member 70 come when the slide door member 70 is moved up to its uppermost and lowermost positions relative to the door housing 60. It is to be noted that the pin holding zones can serve as dust collecting zone.

Referring back to FIG. 4, the slide door member 70 is formed at lateral sides thereof with respective racks 71 and 73. Each rack 71 or 73 is formed on a concave inner surface of the lateral side, as shown. Inside the rack 71 or 73, there is integrally formed a reinforcing lib 72a or 72b which has at the center thereof a round recess 72a' or 72b'.

The pinion gear unit 80 comprises two pinion gears 81 and 82 which are coaxially connected through a shaft 83. As shown, the shaft 83 has a generally square cross section and has both ends detachably put into square holes (no numerals) formed in the pinion gears 81 and 82. The pinion gears 81 and 82 are constructed of a hard plastic. Each pinion gear 81 or 82 is formed at the outer side thereof with a concentric cylindrical bearing portion 81a or 82a. Upon assembly, the bearing portions 81a and 82a are rotatably received in the bearing bores 61a and 62a of the door housing 60 having the pinion gears 81 and 82 meshed with the racks 71 and 73 of the slide door member 70 respectively. The bearing portion 81a is formed at its center with a non-circular opening 81b to which an output shaft of an electric actuator (not shown) is detachably connected. Thus, when the electric actuator is energized, the pinion gears 81 and 82 are rotated to drive the slide door member 70 upward or downward relative to the door housing 60.

Figure 8:
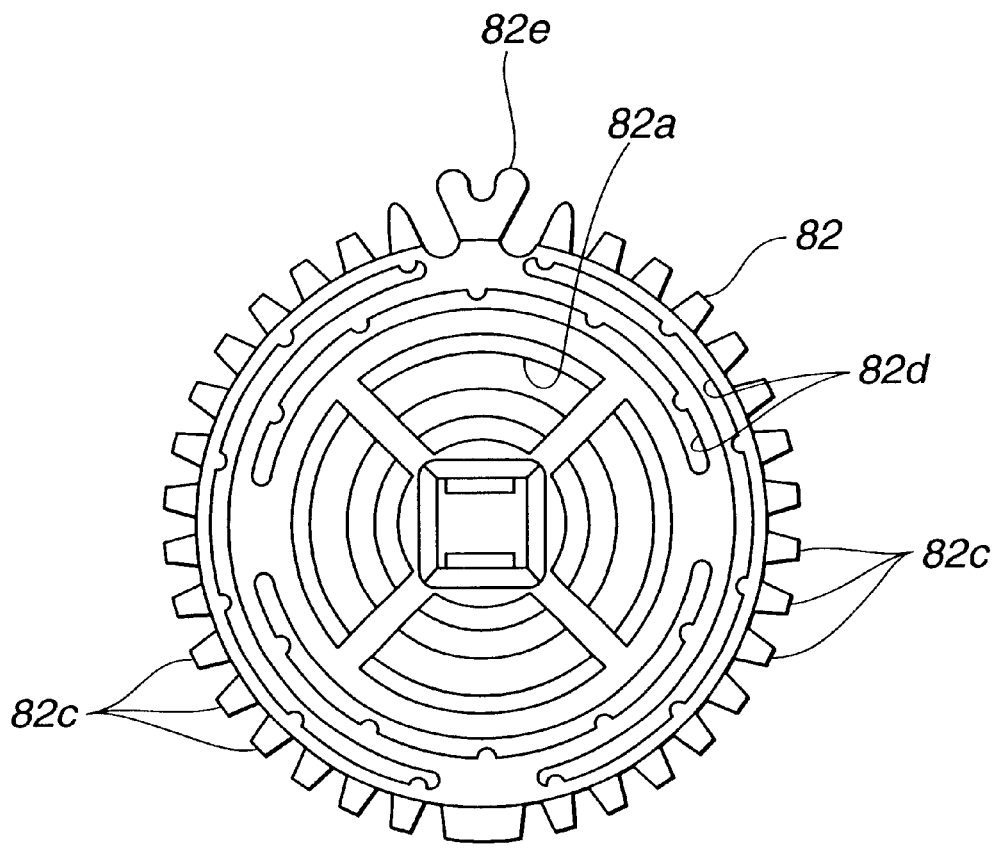
FIG. 8 is a plan view of a pinion gear that constitutes part of the slide door unit of the first embodiment.

As is seen from FIG. 8, each pinion gear 82 or 81 is formed with a plurality of teeth 82c or 81c therearound and at a cylindrical wall thereof with a plurality of arcuate slits 82d which concentrically extend around the center of the pinion gear 82 or 81. With these arcuate slits 82d, a resiliency of the pinion gears 82 and 81 is increased. In other words, a resilient structure is defined between the pinion gear 82 or 81 and the bearing portion 82a or 81a. That is, each pinion gear 82 or 81 is constructed to have a certain resiliency. As shown, the teeth 82c of each pinion gear 82 or 81 are divided into two groups by an enlarged stopper tooth 82e or 81e. As will be become apparent hereinafter, the enlarged stopper teeth 82e and 81e have a function to bias the slide door member 70 toward its uppermost or lowermost position when the slide door member 70 comes to such position.

In the following, steps for assembling the slide door unit 50A will be described with reference to FIG. 4.

First, from and through the upper two pin entrance grooves 62d and 61d of the side walls 62 and 61 of the door housing 60, the upper two guide pins 76 of the slide door member 70 with the collars 78 put thereon are led into the upper two guide grooves 62b and 61b of the side walls 62 and 61. Then, the upper two guide pins 76 are slid to such certain positions of the guide grooves 62b and 61b that the two lower guide pins 76 mate with mouth portions of the two lower pin entrance grooves 62e and 61e. Then, the two lower guide pins 76 are pushed into the lower two guide grooves 62c and 61c through the pin entrance grooves 62e and 61e, sliding the two upper guide pins 76 in and along the upper two guide grooves 62b and 61b. With this, the slide door member 70 is closely and neatly received in the door housing 60, as is understood from FIG. 5.

Then, the cylindrical bearing portions 81a and 82a of the two pinion gears 81 and 82 are put into the bearing bores 61a and 62a of the door housing 60 having the gears 81 and 82 meshed with the racks 71 and 73 of the slide door member 70. Then, the shaft 83 is connected at its square ends to the square holes of the gears 81 and 82. With this, the slide door unit 50A is finally assembled as is seen from FIG. 5.

It is now to be noted that under this assembled condition, due to the above-mentioned resilient construction provided by the arcuate slits 82d, the pinion gears 81 and 82 press resiliently, through the racks 71 and 73, the slide door member 70 against the concave inner surface of the door housing 60. Thus, the four guide pins 76 of the slide door member 70 are resiliently pressed against bottom walls of the corresponding guide grooves 61b, 62b, 61c and 62c with the respective collars 78 put therebetween, respectively.

Accordingly, undesired play of the slide door member 70, which would occur when the door member slides, is suppressed. Since the biasing force produced by the pinion gears 81 and 82 is directly applied to the racks 71 and 73 of the slide door member 70, the play suppressing is achieved with a simple construction. Due the nature of resilient structure provided by the arcuate slits 82d, the biasing force produced by the pinion gears 81 and 82 is suitable for obtaining a smoothed sliding of sliding of the pins 76 in the guide grooves 61b, 62b, 61c and 62c. Since the bottom wall of each guide groove 61b, 62b, 61c or 62cagainst which the pin 76 is resiliently pressed is not the wall which is mated with the pin entrance groove 61d, 62d, 61e or 62e, the sliding of each pin 76 is smoothly carried out without being obstructed by the pin entrance groove.

As will be understood from FIG. 6, when the slide door member 70 is about to come to its lowermost position, the enlarged stopper teeth 82e and 81e of the pinion gears 82 and 81 function to further bias the upper ends of the racks 73 and 71 against the concave inner surface of the door housing 60 thereby assuring insertion of the upper two pins 76 into the outwardly bent lower ends 62b' of the two upper guide grooves 62b and 61b. While, when the slide door member 70 is about to come to its uppermost position (as shown in FIG. 7) due to clockwise rotation of the pinion gears 82 and 81, the enlarged stopper teeth 82e and 81e function to further bias the lower ends of the racks 73 and 71 against the concave inner surface of the door housing 60 thereby assuring insertion of the lower two pins 76 into the outwardly bent upper ends 62c' of the two lower guide grooves 62c and 61c. Thus, even when assuming the lowermost or uppermost position, the slide door member 70 can be stably held in the position without play.

As will be seen from FIGS. 1 and 3, when assembled in the automotive air conditioner 10, the slide door unit 50A having the above-mentioned construction is mounted behind the evaporator 18. More specifically, as is seen from FIG. 3, the upper and lower brackets 20a and 20b for the evaporator 18 are integrally formed with extra brackets 20a' and 20b' by which upper and lower edges of the door housing 60 are detachably held. Bolts are used for assuring the connection between the door housing 60 and the extra brackets 20a' and 20b'. As has been mentioned hereinabove, under this fully assembled condition, the two rectangular openings "BO" defined between the two straight bar members 63 and 64 of the door housing 60 face the mouth portion M-BAP of the bypass air passage BAP, while and the other two rectangular openings "HO" defined between the two straight bar members 64 and 65 of the door housing 60 face the mouth portion M-HAP of the heated air passage HAP.

In the following, operation of the slide door unit 50A will be described with reference to the drawings, particularly FIG. 1.

For ease of understanding, the description will be commenced with respect to a full-cool mode of the air conditioner 10.

FULL-COOL MODE

In this full-cool mode, only the ventilation opening 30 is communicated with the air mix zone AMZ and the slide door member 70 of the slide door unit 50A assumes its lowermost position to fully open the bypass air passage BAP while fully closing the heated air passage HAP. That is, as is understood from FIGS. 4 and 6, the slide door member 70 fully closes the lower two rectangular openings "HO" while fully opening the upper two rectangular openings "BO". Thus, air from the air blower 16 is cooled by the evaporator 18 and passes only through the bypass air passage BAP before reaching the air mix zone AMZ. Thus, cooled air is led to the passenger room through the conditioner air distribution passage CADP and the ventilation opening 30. Since the heated air passage HAP in which the heater core 22 is installed is fully closed, cooled air led to the passenger room is not heated or warmed. Although the cooled air that has just passed through the bypass air passage BAP is forced to contact a rear surface of the heater core 22, heat transfer from the heater core 22 to the air is negligible with respect to the volume of air directed to the air mix zone AMZ. If, under this condition, the first and second pivot doors 32 and 34 are partially opened, the cooled air is directed also to both the foot space of the passenger room and the windshield WS.

That is, as is seen from FIG. 6, under the full-cool mode, the slide door member 70 assumes its lowermost position. Due to the pressing function of the enlarged stopper teeth 82e and 81e of the pinion gears 82 and 81, the lowermost position of the slide door member 70 is stably achieved as has been mentioned hereinabove.

BI-LEVEL MODE

When now the electric actuator is energized for a given time, the pinion gears 82 and 81 are rotated clockwise in FIG. 6. With this, the slide door member 70 is driven upward along the given way provided by the two pairs of the guide grooves 62b, 62c, 61b and 61c. When the slide door member 70 assumes an intermediate position in the given way, a bi-level mode is established.

Under this mode, both the lower two rectangular openings "HO" and the upper two rectangular openings "BO" are opened but partially. Thus, cooled air from the evaporator 18 can pass through both the heated air passage HAP and the bypass air passage BAP in parallel. The cooled air passing through the heated air passage HAP is heated or warmed by the heater core 22 before reaching the air mix zone AMZ, while the cooled air passing through the bypass air passage BAP directly reaches the air mix zone AMZ to mix with the heated air from the heated air passage HAP. That is, in the air mix zone AMZ, temperature conditioned air is prepared, which is then directed to the conditioned air distribution passage CADP. Thus, in accordance with the open condition of the first and second pivot doors 32 and 34, the temperature-conditioned air is distributed to desired areas of the passenger room "PR".

FULL-HOT MODE

When, then, due to energization of the electric actuator, the slide door member 70 is moved up to its uppermost position to fully open the heated air passage HAP while fully closing the bypass air passage BAP. That is, in this case, the slide door member 70 fully opens the lower two rectangular openings "HO" while fully closing the upper two rectangular openings "BO". Thus, air from the evaporator 18 passes only through the heated air passage HAP before reaching the air mix zone AMZ. Thus, in this mode, hot air is distributed to desired areas of the passenger room "PR" in accordance with the open condition of the first and second pivot doors 32 and 34.

Figure 9:
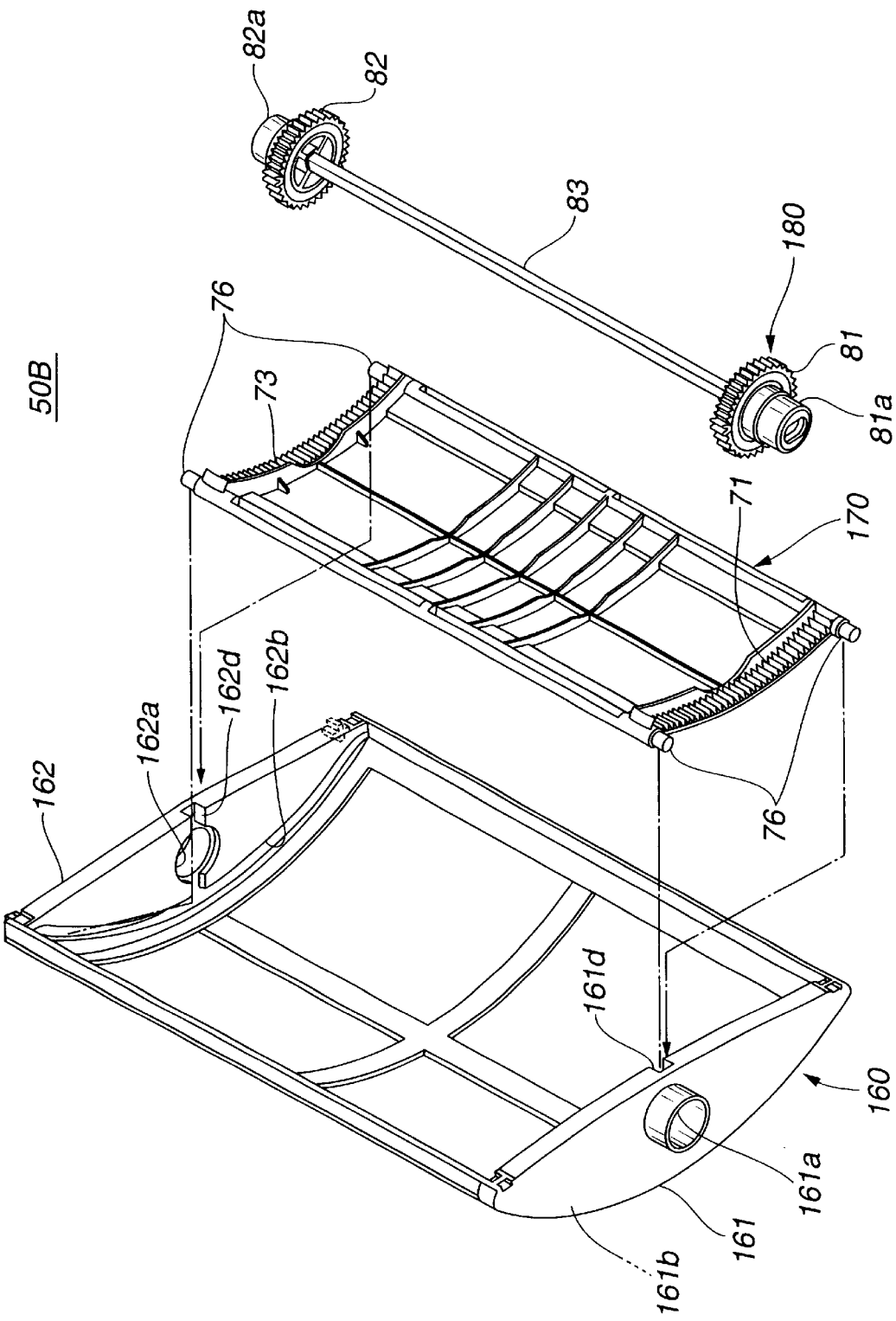
FIG. 9 is a view similar to FIG. 4, but showing a slide door unit of a second embodiment of the present invention.
Figure 10:
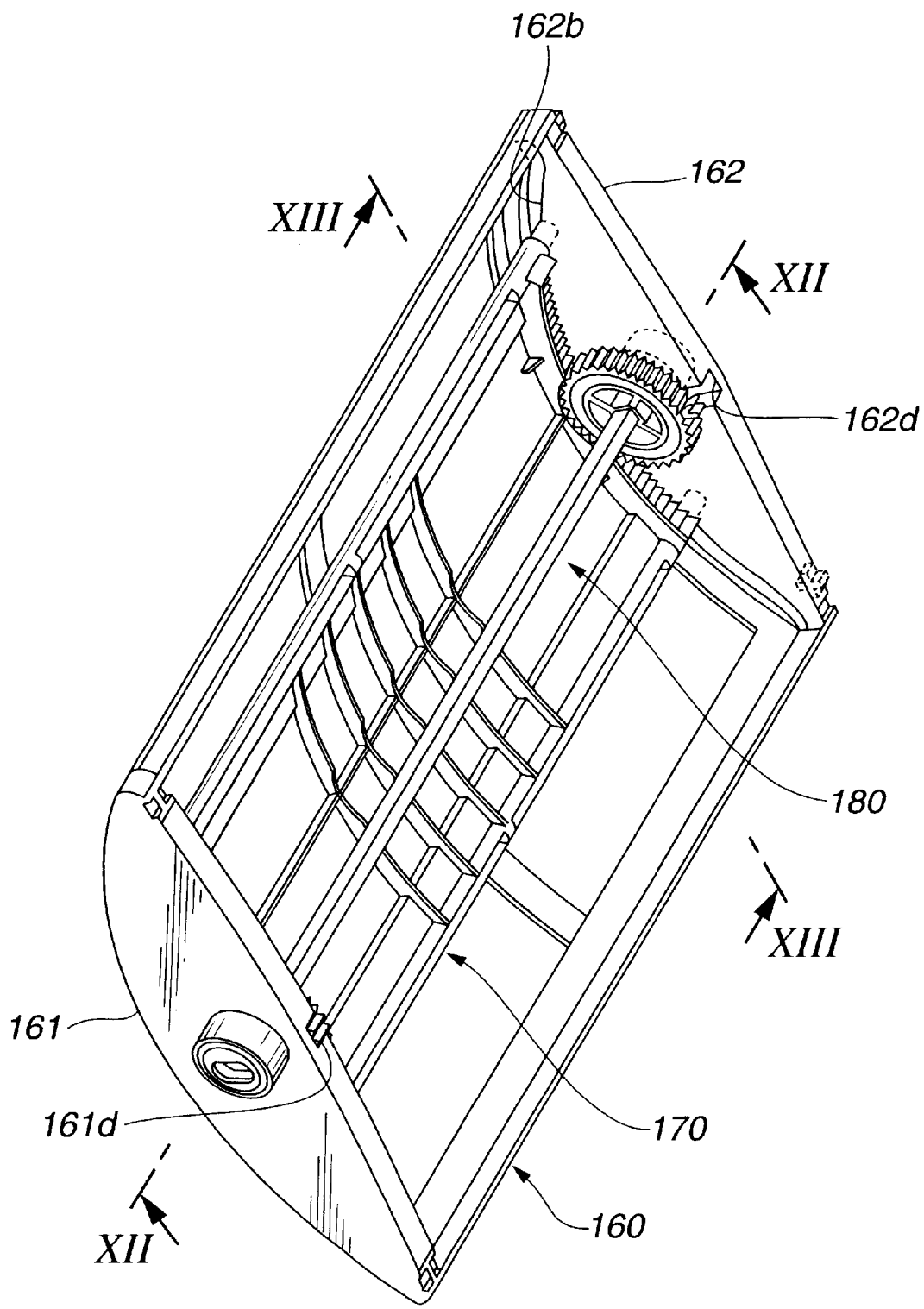
FIG. 10 is a perspective view of the slide door unit of the second embodiment in an assembled condition.

Referring to FIGS. 9 to 14, particularly FIGS. 9 and 10, there is shown a slide door unit 50B which is a second embodiment of the present invention.

Since the slide door unit 50B of the embodiment is similar to that 50A of the above-mentioned first embodiment, only parts or portions that are different from those of the first embodiment will be described in detail in the following.

As will be seen from FIG. 9, the two crescent-shaped side walls 161 and 162 of the barrel door housing 160 are different from those of the door housing 60 of the first embodiment 50A.

Each side wall 162 or 161 is formed at a middle portion thereof with a bearing bore 162a or 161a and at an inside surface thereof with a single arcuate guide groove 162b or 161b. As shown, the arcuate guide groove 162b or 161b is positioned at the innermost area of the door housing 160.

As is seen from FIG. 11, for the reason as has mentioned hereinabove, the arcuate groove 162b or 161b has upper and lower ends 162b' and 162b" which are bent outward, that is, toward the outside of the door housing 160.

Figure 11:
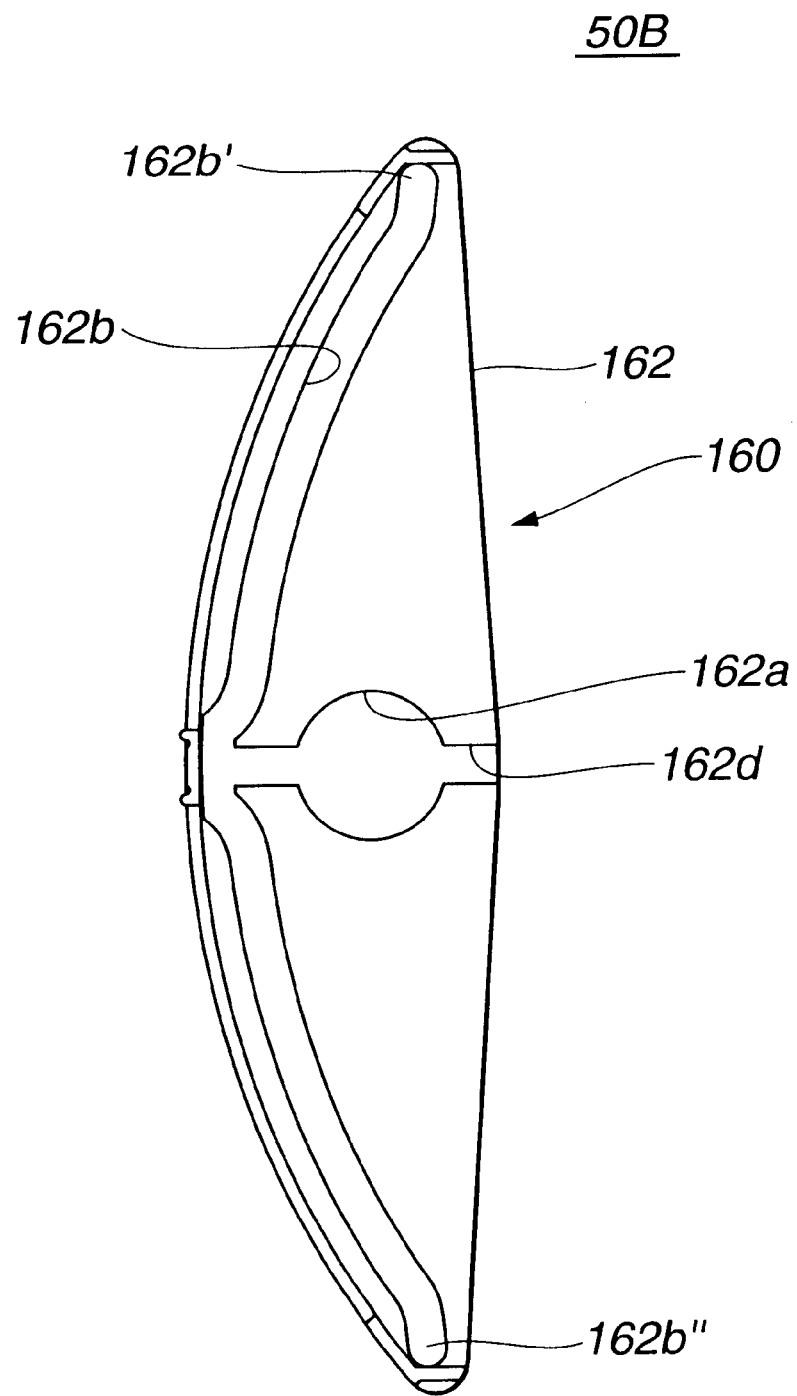
FIG. 11 is a view similar to FIG. 7, but showing a side wall of a door housing employed as a part of the slide door unit of the second embodiment.
Figure 12:
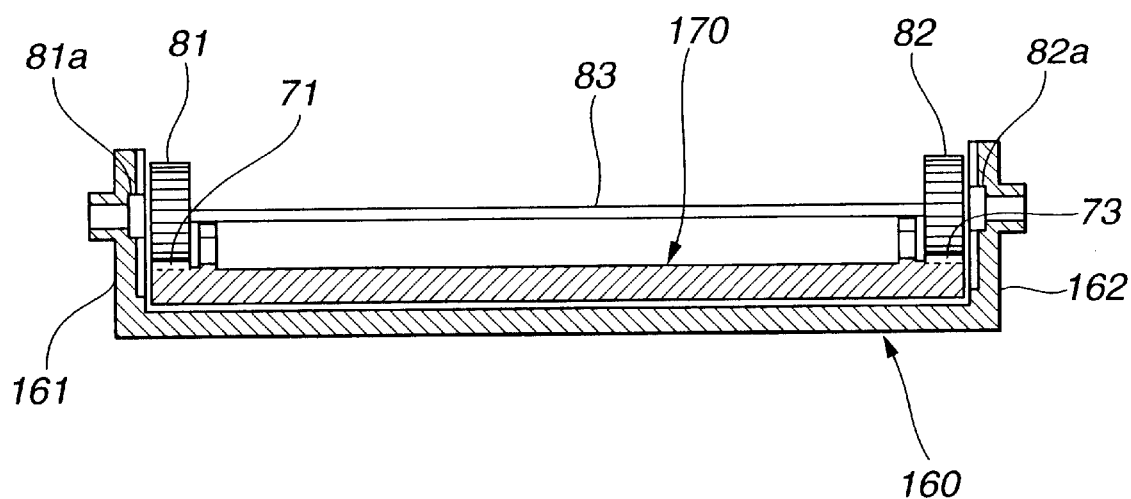
FIG. 12 is a sectional view taken along the line XII—XII of FIG. 10.
Figure 13:
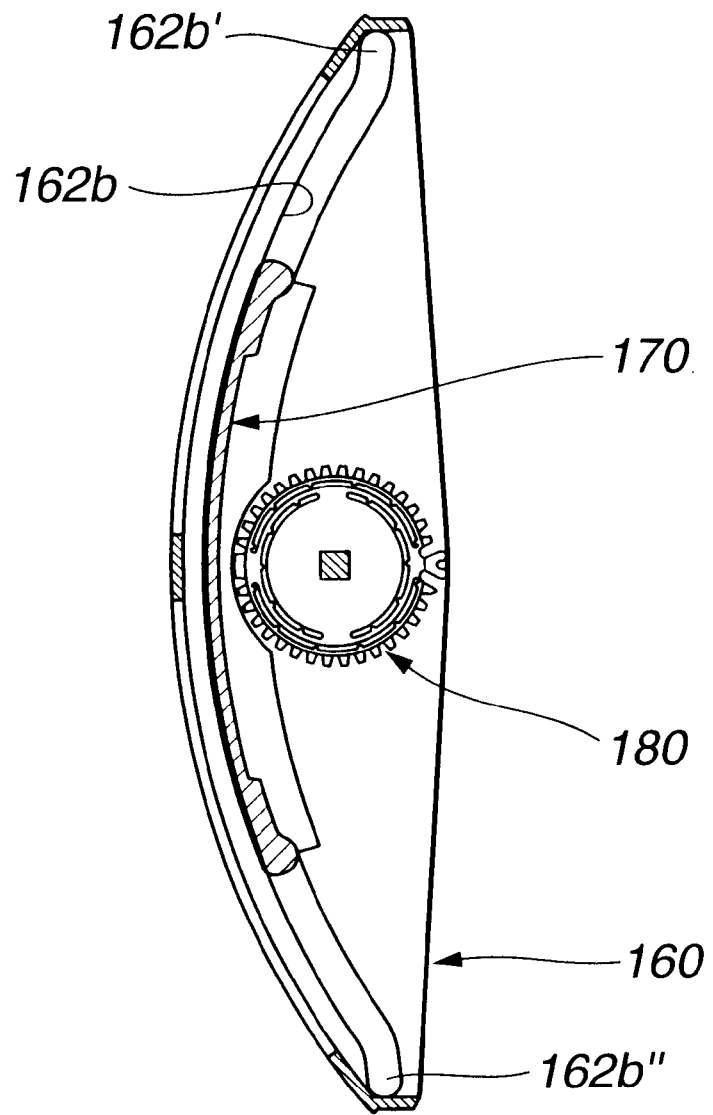
FIG. 13 is a sectional view taken along the line XIII—XIII of FIG. 10.

As is seen from FIGS. 9 and 11, each side wall 162 or 161 is formed at the inside surface thereof with a single pin entrance groove 162d or 161d which is merged at its leading end with the arcuate guide groove 162b or 161b and at its middle portion with the bearing bore 162a or 161a. As is well shown in FIG. 11, the pin entrance groove 162d or 161d extends through a center of the bearing bore 162a or 161a to a middle portion of the arcuate guide groove 162d or 161d.

It is to be noted that the slide door member 170 and the pinion gear unit 180 are substantially the same as the slide door member 70 and the pinion gear unit 80 of the first embodiment 50A.

In the following, steps for assembling the slide door unit 50B of the second embodiment will be described with reference to FIG. 9.

First, from and through the pin entrance grooves 162d and 161d of the side walls 162 and 161 of the door housing 160, the upper two guide pins 76 are led into the respective arcuate guide grooves 162b and 161b of the side walls 162 and 161. Then, the upper guide pins 76 are slid to such certain positions of the guide grooves 162b and 161b that the two lower guide pins 76 mate with mouth portions of the pin entrance grooves 162d and 161d. Then, the two lower guide pins 76 are pushed into the guide grooves 162b and 161b, sliding the two upper guide pins 76 toward deeper positions in the guide grooves 162b and 161b. With this, the slide door member 170 is closely and neatly received in the door housing 160, as is understood from FIG. 10.

Then, the cylindrical bearing portions 81a and 82a of the two pinion gears 81 and 82 are put into the bearing bores 161a and 162a of the door housing 160 having the gears 81 and 82 meshed with the racks 71 and 73 of the side door member 170. Then, the shaft 83 is connected at the square ends to the square holes of the gears 81 and 82. With this, the slide door unit 50B is finally assembled as is seen from FIG. 10.

Since the construction of the slide door unit 50B is substantially the same as that of the first embodiment 50A except the number of the arcuate guide groove and the pin entrance grooves, the slide door unit 50B of the second embodiment is given substantially same advantages as those of the first embodiment 50A. In the second embodiment 50B, simpler construction is achieved as compared with the first embodiment 50A, which brings about a reduction in cost.

Figure 14:
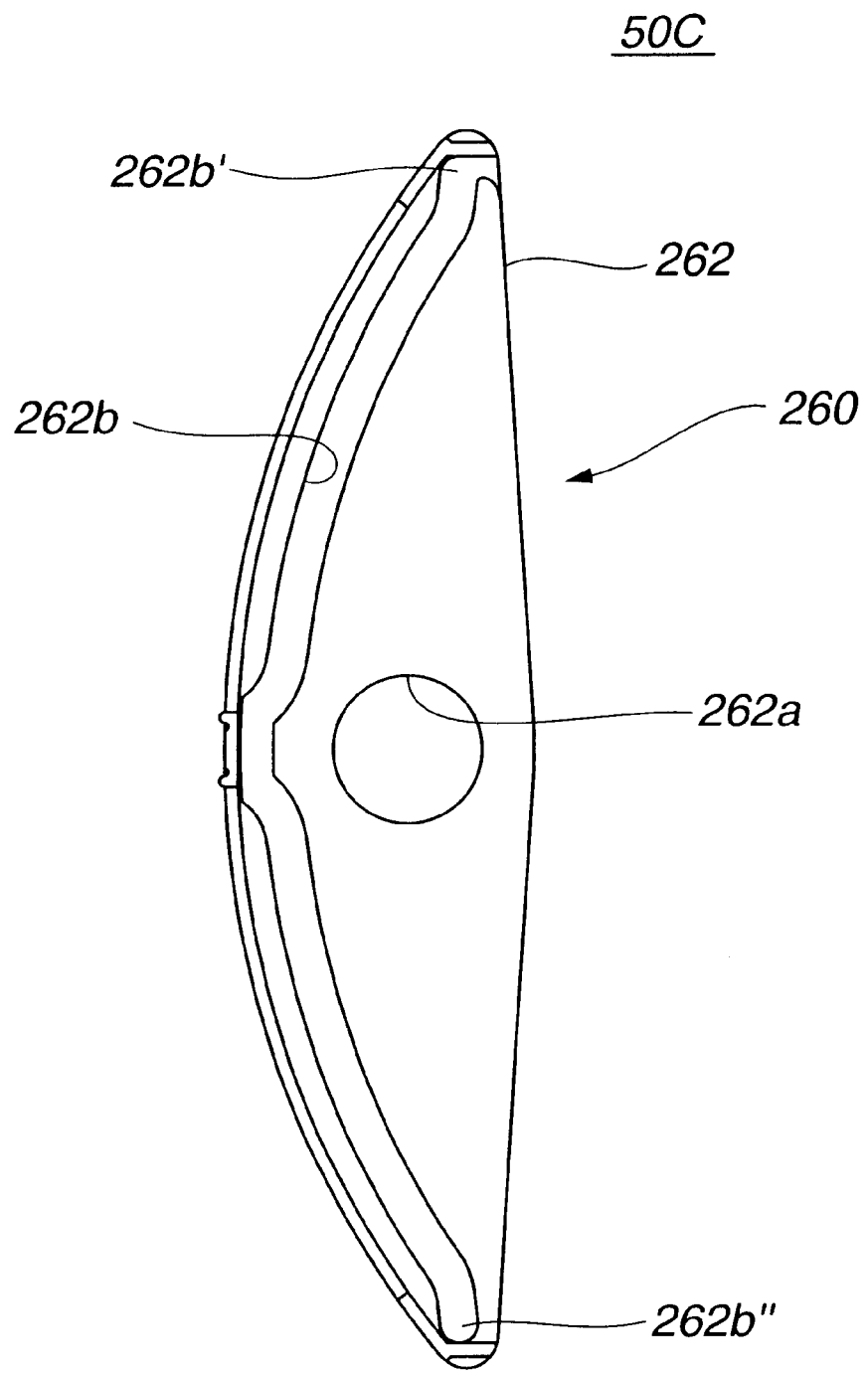
FIG. 14 is a view similar to FIG. 13, but showing only a side wall of a door housing employed as a part of a side door unit of a third embodiment.

Referring to FIG. 14, there is shown one of two crescent-shaped side walls 262 of a barrel door housing employed in a slide door unit 50C of a third embodiment of the present invention. The side wall 262 is formed at a middle portion thereof with a bearing bore 262a for receiving the cylindrical bearing portion 82a of the pinion gear 82 and at an inside surface thereof with a single arcuate guide groove 262b for receiving the upper and lower guide pins 76 of the slide door member.

It is now to be noted that in this third embodiment 50C, one of the outwardly bent ends 262b' and 262b" of the arcuate guide groove 262b, that is, the upper bent end 262b' in the illustrated embodiment extends to the outside of the side wall 262 to serve as a pin entrance guide groove. That is, upon need of assembly of the slide door member onto the door housing 260, the lower and upper guide pins 76 of the slide door member are led into the arcuate guide groove 262b through the opened upper bent end 262b'. In this embodiment 50C, increased mechanical strength is given to the slide door unit 50C because the same has no groove corresponding to the above-mentioned pin entrance groove 62d, 62e, 61d, 61e, 162d or 161d.

Figure 15:
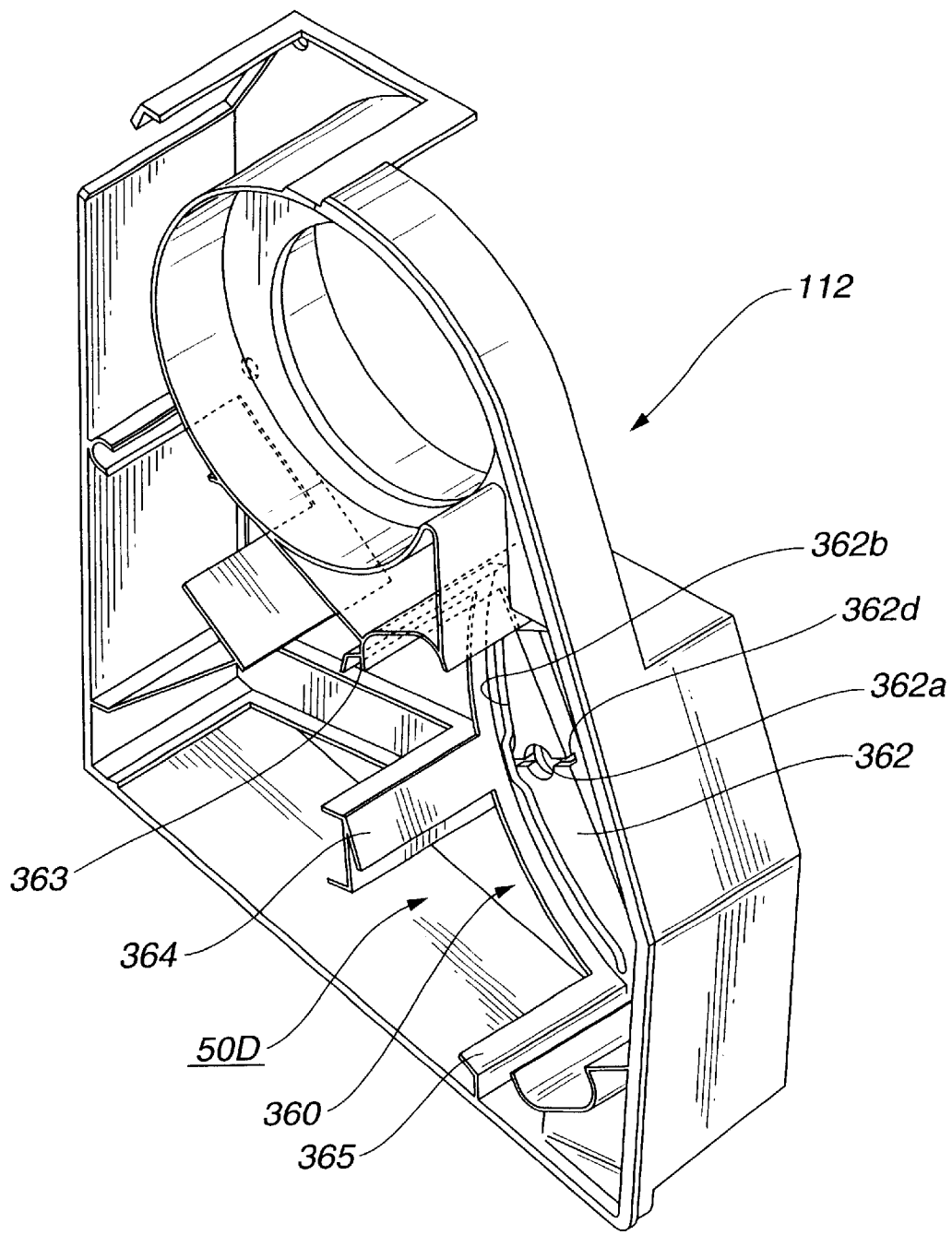
FIG. 15 is a perspective view of a right-half part of a split type case which integrally forms a door housing employed as a part of a slide door unit of a fourth embodiment of the present invention.
Figure 16:
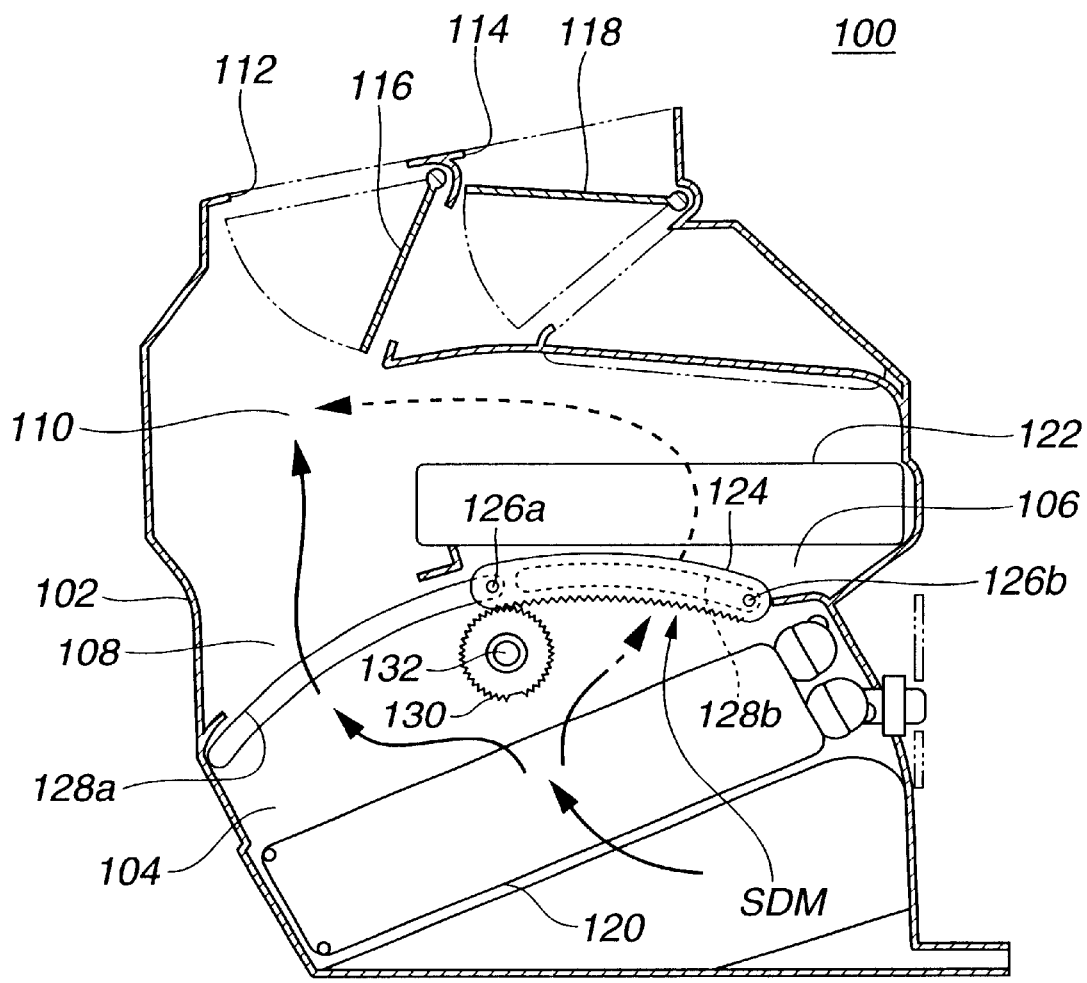
FIG. 16 is a sectional view of an automotive air conditioner that uses a known slide door arrangement.

Referring to FIG. 15, there is shown a fourth embodiment 50D of the present invention. That is, in this embodiment, a door housing for the slide door unit 50D is integrally defined by a split type case 112 of the air conditioner.

The drawing shows a right-side half part of the split type case 112. Although not shown in the drawing, a left-side half part having a symmetrical structure to the right-side half part is also provided, which is coupled with the right-side one to constitute the case 112.

As is seen from the drawing, a barrel door housing 360 is integrally formed in the case 112. That is, each side half part of the case 112 has a crescent-shaped side wall 362 and three half length straight bar members 363, 364 and 365. The side wall 362 is formed with a bearing bore 362a, a single arcuate guide groove 362b and a pin entrance groove 362d which are arranged in substantially the same manner as those of the second embodiment 50B of FIG. 11. Thus, when the two half parts of the case 112 are properly coupled, a door housing, such as the door housing 160 (see FIG. 9) of the second embodiment 50B, is constructed in the casing 112.

For assembling the slide door unit 50D, the following steps are needed.

First, the slide door member and the pinion gear unit are temporarily assembled together to provide a unit. Then the unit is set in a right position of the right-side half of the case, and then the left-side half of the case is coupled with the right-side one assuring proper setting of the unit onto the door housing.

In the foregoing description, for providing the pinion gear 81 or 82 with a suitable resiliency, a plurality of slits 82d are used. However, in place of the slits, a plurality of grooves may be used for the same purpose.

The entire contents of Japanese Patent Applications 11-292850 (filed Oct. 14, 1999), 11-294438 (filed Oct. 15, 1999) and 11-375836 (filed Dec. 28, 1999) are incorporated herein by reference.

Although the invention has been described above with reference to certain embodiments of the invention, the invention is not limited to such embodiments as described above. Various modifications and variations of such embodiments may be carried out by those skilled in the art, in light of the above descriptions.

What is claimed is:

1. A slide door unit for use in an automotive air conditioner, said unit comprising:

a door housing having a concave inner surface and laterally opposed side walls, said side walls having respective arcuate guide grooves;

a slide door member having a convex outer surface slidable on and along the concave inner surface of said door housing, said slide door member having a concave inner surface;

racks provided on laterally opposed sides of the concave inner surface of said slide door member;

guide pins secured to laterally opposed ends of said slide door member, said guide pins being slidably engaged with said arcuate guide grooves of said door housing;

a pinion gear unit including two pinion gears and a shaft by which said pinion gears are connected, said pinion gear unit being rotatably held by the laterally opposed side walls of said door housing having said two pinion gears meshed with said racks respectively; and a resilient structure defined by each of the pinion gears of said pinion gear unit, said resilient structure biasing said pinion gears against said racks, thereby pressing the guide pins against bottom walls of the corresponding arcuate guide grooves when said pinion gear unit is properly held by said door housing.

2. A slide door unit as claimed in claim 1, in which said resilient structure comprises a plurality of arcuate slits which concentrically extend around the center of the pinion gear.

3. A slide door unit as claimed in claim 2, in which said resilient structure is defined between coaxially arranged first and second cylindrical portions, said first cylindrical portion having thereon a plurality of teeth which are meshed with the corresponding rack of said slide door member and said second cylindrical portion being rotatably disposed in a bearing bore formed in the corresponding side wall of said door housing.

4. A slide door unit as claimed in claim 1, in which each of said side walls of said door housing is formed with a guide pin entrance groove which extends from a ceiling wall of the corresponding guide groove to the outside of said side wall.

5. A slide door unit as claimed in claim 4, in which said guide pin entrance groove extends to a middle portion of the corresponding guide groove.

6. A slide door unit as claimed in claim 5, in which said guide pin entrance groove extends through a center of a bearing bore which is formed in the corresponding side wall of said door housing to rotatably receive a cylindrical bearing portion of the corresponding pinion gear.

7. A slide door unit as claimed in claim 1, in which each of said arcuate guide grooves has both ends which are bent outward from the corresponding side wall.

8. A slide door unit as claimed in claim 7, in which one of the bent ends of the arcuate guide groove extends to the outside of the corresponding side wall to serve as a guide pin entrance groove.

9. A slide door unit as claimed in claim 1, in which each of said side walls of said door housing is formed with two lengthwise arranged arcuate guide grooves, and in which each of the laterally opposed ends of said slide door member is provided with two guide pins which are respectively and slidably engaged with the two lengthwise arranged arcuate guide grooves.

10. A slide door unit as claimed in claim 1, in which each of said guide pins has a sliding movement promotion member for smoothing the movement thereof in and along the corresponding arcuate guide groove.

11. A slide door unit as claimed in claim 10, in which said sliding movement promotion member is a collar which is rotatably disposed on the guide pin.

12. A slide door unit as claimed in claim 10, in which said sliding movement promotion member is a plastic cap which covers the guide pin.

13. A slide door unit as claimed in claim 10, in which said sliding movement promotion member is a sliding tape which is put around the guide pin.

14. A slide door unit as claimed in claim 1, in which said door housing is integrally formed by a case of said air conditioner.

15. A slide door unit for use in an automotive air conditioner, said unit comprising:

a barrel door housing having a concave inner surface and laterally opposed side walls each having a crescent shape;

an arcuate guide groove formed at an inner surface of each side wall of said door housing;

a guide pin entrance groove formed at the inner surface of each side wall of the door housing, said entrance groove extending from said arcuate guide groove to the outside of the side wall;

a barrel slide door member having a convex outer surface slidable on and along the concave inner surface of said door housing, said slide door member having a concave inner surface;

racks integrally formed on laterally opposed sides of the concave inner surface of said slide door member;

two upper guide pins secured to upper portions of laterally opposed ends of said slide door member respectively, said two upper guide pins being slidably engaged with one zones of the arcuate guide grooves of the opposed side walls respectively;

two lower guide pins secured to lower portions of said laterally opposed ends of said slide door member respectively, said two lower guide pins being slidably engaged with the other zones of the arcuate guide grooves of the opposed side walls respectively;

a pinion gear unit including two pinion gears and a shaft by which said pinion gears are coaxially connected, said pinion gear unit being rotatably held by the side walls of said door housing having said two pinion gears meshed with said racks respectively; and a plurality of arcuate slits concentrically formed in each of the pinion gears of the pinion gear unit to provide the pinion gear with a resiliency by which said pinion gears are biased against the racks thereby to press the guide pins against bottom walls of the corresponding arcuate guide grooves.

16. A slide door unit for use in an automotive air conditioner, said unit comprising:

a barrel door housing having a concave inner surface and laterally opposed side walls each having a crescent shape;

upper and lower arcuate guide grooves formed at an inner surface of each side wall of said door housing, said upper and lower arcuate guide grooves being arranged lengthwise;

upper and lower guide pin entrance grooves formed at the inner surface of each side wall of the door housing, said entrance grooves extending from the respective upper and lower arcuate guide grooves to the outside of said side walls;

a barrel slide door member having a convex outer surface slidable on and along the concave inner surface of said door housing, said slide door member having a concave inner surface;

racks integrally formed on laterally opposed sides of the concave inner surface of said slide door member;

two upper guide pins secured to upper portions of laterally opposed ends of said slide door member respectively, said two upper guide pins being slidably engaged with the upper guide grooves of the opposed side walls respectively;

two lower guide pins secured to lower portions of said laterally opposed ends of said slide door member respectively, said two lower guide pins being slidably engaged with the lower guide grooves of the opposed side walls respectively;

a pinion gear unit including two pinion gears and a shaft by which said pinion gears are coaxially connected, said pinion gear unit being rotatably held by the side walls of said door housing having said two pinion gears meshed with said racks respectively; and a plurality of arcuate slits concentrically formed in each of the pinion gears of the pinion gear unit to provide the pinion gear with a resiliency by which said pinion gears are biased against the racks thereby to press the guide pins against bottom walls of the corresponding arcuate guide grooves.

* * * * *